US008813577B1

(12) United States Patent
England et al.

(10) Patent No.: US 8,813,577 B1
(45) Date of Patent: *Aug. 26, 2014

(54) SELF-CONTAINED COMPRESSED-FLOW GENERATION DEVICE FOR USE IN MAKING DIFFERENTIAL MEASUREMENTS

(75) Inventors: John Dwight England, Arab, AL (US); Anthony R. Kelley, Sommerville, AL (US); Raymond J. Cronise, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 422 days.

This patent is subject to a terminal disclaimer.

(21) Appl. No.: 13/302,734

(22) Filed: Nov. 22, 2011

(51) Int. Cl.
*G01F 1/46* (2006.01)
(52) U.S. Cl.
USPC ........................................... 73/861.65
(58) Field of Classification Search
None
See application file for complete search history.

(56) References Cited

U.S. PATENT DOCUMENTS

| | | | |
|---|---|---|---|
| 3,558,162 A | 1/1971 | Ferrai et al. | |
| 3,585,859 A * | 6/1971 | De Leo et al. | 73/861.65 |
| 4,378,697 A * | 4/1983 | DeLeo et al. | 73/861.65 |
| 4,823,615 A | 4/1989 | Taha | |
| 4,968,066 A | 11/1990 | Adams | |
| 5,331,849 A * | 7/1994 | Hedberg et al. | 73/861.65 |
| 5,612,499 A | 3/1997 | Andrew et al. | |
| 5,853,030 A | 12/1998 | Walding | |
| 5,971,001 A | 10/1999 | Andersson | |
| 6,058,787 A * | 5/2000 | Hughes | 73/861.63 |
| 7,001,106 B2 | 2/2006 | Burnham et al. | |
| 7,070,209 B2 | 7/2006 | Collins | |
| 7,478,565 B2 * | 1/2009 | Young | 73/861.65 |
| 7,497,772 B2 | 3/2009 | Laib | |
| 7,674,072 B2 | 3/2010 | Shook et al. | |
| 7,681,461 B2 | 3/2010 | Rosenbaum et al. | |
| 7,735,381 B2 | 6/2010 | Lodolo | |
| 8,555,731 B1 * | 10/2013 | England et al. | 73/861.42 |
| 2004/0007080 A1 * | 1/2004 | Vozhdaev et al. | 73/861.65 |
| 2007/0157738 A1 * | 7/2007 | Hughes et al. | 73/861.52 |
| 2012/0180572 A1 * | 7/2012 | Lawrence | 73/861.65 |

FOREIGN PATENT DOCUMENTS

EP 0249362 A1 12/1987

* cited by examiner

*Primary Examiner* — Harshad R Patel
(74) *Attorney, Agent, or Firm* — Peter J. Van Bergen; James J. McGroary

(57) ABSTRACT

A device used in making differential measurements of a flow includes a flow obstruction and a support arm. The flow obstruction's forward portion is a nose cone. The flow obstruction's aft portion is coupled to the nose cone. The support arm's first end is coupled to an exterior wall of a conduit, and its second end is coupled to the forward portion of the flow obstruction. The support arm positions the flow obstruction in the conduit such that a flow region is defined around its nose cone, and such that the support arm's first and second end are separated from one another with respect to a length dimension of the conduit. Measurement ports are provided in the support arm and flow obstruction. Manifolds extending through the flow obstruction and support arm couple the ports to points at the exterior wall of the conduit.

18 Claims, 3 Drawing Sheets

SELF-CONTAINED COMPRESSED-FLOW GENERATION DEVICE FOR USE IN MAKING DIFFERENTIAL MEASUREMENTS

The invention described herein was made in part by employees of the United States Government and may be manufactured and used by or for the Government of the United States of America for governmental purposes without the payment of any royalties thereon or therefor.

CROSS-REFERENCE TO RELATED PATENT APPLICATIONS

This patent application is co-pending with one related patent application entitled "SELF-CONTAINED TUBULAR COMPRESSED-FLOW GENERATION DEVICE FOR USE IN MAKING DIFFERENTIAL MEASUREMENTS", filed by the same inventors and owned by the same assignee as this patent application.

BACKGROUND OF THE INVENTION

1. Field of the Invention

This invention relates to flow measurement tools. More specifically, the invention is a self-contained device that generates compressed flow in a conduit for use in making differential measurements in a flow.

2. Description of the Related Art

For a variety of reasons, devices are needed that can be adapted to an existing fluid conduit for the temporary or permanent provision of specific functions. One such function is the measurement of a parameter of a flowing fluid. Other functions include mixing the flowing fluid and/or injecting a second fluid into the (main) flowing fluid. With respect to parameter measurement, attributes of interest include pressure, velocity, density, temperature, etc. Currently, many flow "measurement" devices collect flow information that is then used in some approximation or modeling scheme to estimate flow attributes. In addition, current flow measurement devices are installed by cutting fully through existing conduits and then "splicing" the flow measurement devices into the conduit. This can be time consuming, tedious, and costly. This is especially problematic when making differential measurements (i.e., at two spaced apart locations along a conduit) as multiple devices must be spliced into a conduit with the entire installation then requiring calibration to account for installation irregularities. Still further, current differential flow measurement devices can create substantial pressure losses effecting pump efficiency. Flow measurement devices can also be the source of a blockage in a conduit when solids and/or foreign matter are present in a flowing fluid (e.g., man-made debris, natural debris such as hair, sticks, leaves, etc.). For example, a flow measurement device such as an orifice plate is readily clogged with debris thereby impacting flow measurements and the flow itself.

SUMMARY OF THE INVENTION

Accordingly, it is an object of the present invention to provide a device that can be used when making differential measurements in a flowing fluid.

Another object of the present invention is to provide a device that can be readily installed in an existing conduit or duct in preparation for making differential measurements of a fluid flow moving through the conduit.

Still another object of the present invention is to provide a flowing-fluid differential measurement-supporting device that is resistant to clogging.

Other objects and advantages of the present invention will become more obvious hereinafter in the specification and drawings.

In accordance with the present invention, a compressed-flow generation device for use in making differential measurements of flow attributes includes a flow obstruction and a support arm. The flow obstruction has a forward portion and an aft portion. The forward portion consists of a nose cone having a minimum-radius tip at one end thereof and a maximum-radius tail at another end thereof. The aft portion is coupled to the maximum-radius tail. The support arm has a first end coupled to an exterior wall of a conduit, and a second end coupled to the forward portion of the flow obstruction. The support arm positions the flow obstruction in the conduit such that a flow region is defined around its maximum-radius tail, and such that the support arm's first end and second end are separated from one another with respect to a length dimension of the conduit. At least one upstream measurement port is formed in the support arm. A first manifold is formed in the support arm and is in fluid communication with each upstream measurement port. The first manifold terminates and is accessible at the exterior wall of the conduit. At least one downstream measurement port is formed in the flow obstruction. A second manifold is formed in the flow obstruction and the support arm. The second manifold is in fluid communication with each downstream measurement port. The second manifold terminates and is accessible at the exterior wall of the conduit.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
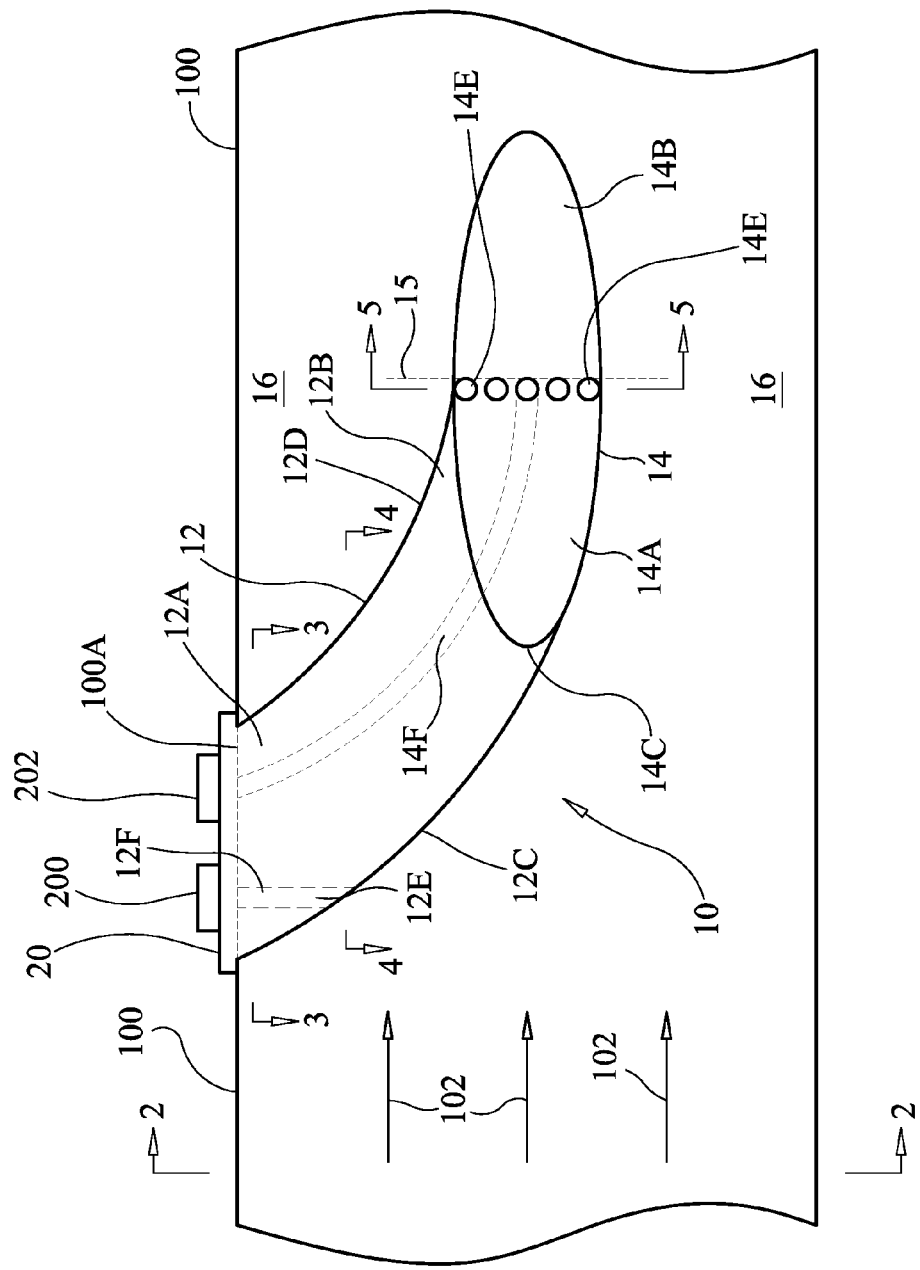
FIG. 1 is a side view of a self-contained device for generating a compressed flow in a conduit to facilitate differential measurements in accordance with an embodiment of the present invention.
Figure 2:
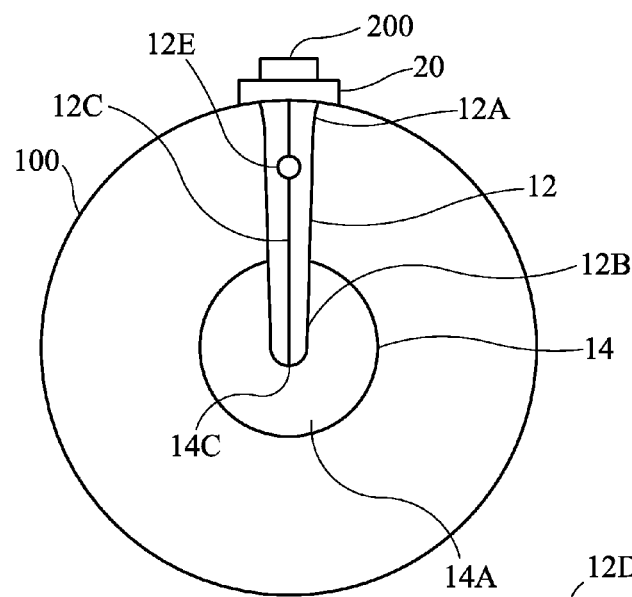
FIG. 2 is a head-on view of the self-contained device taken from an upstream location indicated by line 2-2 in FIG. 1.

Referring now to the drawings; simultaneous reference will be made to FIGS. 1-5 where a variety of views of a self-contained device for generating a compressed flow in a conduit to facilitate the collection of differential measurements in accordance with an embodiment of the present invention is shown and is referenced generally by numeral 10. Device 10 is positioned/mounted in a duct or conduit 100 that carries a flowing fluid moving in a known direction where such fluid and its flow direction are indicated by arrows 102.

The terms "upstream" and "downstream" as used herein are referenced to the flow direction of fluid flow 102. Fluid flow 102 can be a gas, vapor, a pure liquid, or a gas or liquid mixed with some solids that are present by design or by circumstance. For example, fluid flow 102 could contain natural or man-made debris that must pass through conduit 100 and past device 10 to maintain flow efficiency.

In general, device 10 is a self-contained device that positions measurement ports in fluid flow 102 in a pre-determined and definitive manner such that differential measurements concerning flow 102 can be made easily and precisely. Device 10 includes a support arm 12 and a compressed-flow-generating obstruction 14. Obstruction 14 is positioned in fluid flow 102 by support arm 12 such that fluid flow 102 is compressed in a region 16 around obstruction 14. Measurement ports are provided in both support arm 12 and obstruction 14 to facilitate differential measurements concerning fluid flow 102. That is, one or more measurement ports are located in support arm 12 where fluid flow 102 is not compressed, and one or more measurement ports are located in obstruction 14 where fluid flow 102 is compressed to thereby create a differential measurement environment.

Support arm 12 and obstruction 14 can be separate elements coupled to one another or they can be formed as an integrated device (e.g., molded as one piece). In either case, device 10 can be installed as part of conduit 100 or can be installed in an existing conduit 100. In terms of an existing conduit 100, an installation/entry aperture (indicated by dashed line 100A) is cut in conduit 100. Aperture 100A is sized/shaped to receive support arm 12 and obstruction 14 therethrough. Once positioned in conduit 100, device 10 is coupled and sealed to conduit 100 by means of a mounting/sealing arrangement 20, the design of which is not a limitation of the present invention. Since conduit 100 need only have a simple aperture 100A cut therein, the overall integrity, shape, and size of conduit 100 is maintained such that device 10 has little or no impact on the existing system.

Figure 3:
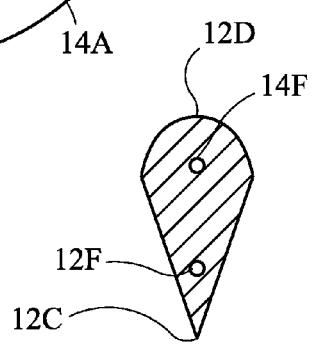
FIG. 3 is a cross-sectional view of the device's support arm taken along line 3-3 in FIG. 1.
Figure 4:
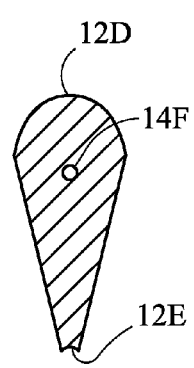
FIG. 4 is a cross-sectional view of the device's support arm taken along line 4-4 in FIG. 1.

In general, support arm 12 is shaped to position obstruction 14 such that the above-described compressed flow region 16 is downstream (with respect to the flow direction of fluid flow 102) of an upstream portion of support arm 12. For example, in the illustrated embodiment, support arm 12 defines a smooth arcuate shape along its length with its upstream end 12A coupled to conduit 100 by mounting/sealing arrangement 20. The downstream end 12B of support arm 12 is coupled to obstruction 14 with downstream end 12B blending smoothly into obstruction 14 to minimize turbulence at this interface. The leading edge 12C of support arm 12 facing into the oncoming fluid flow 102 can be tapered as illustrated in FIG. 3 to reduce or eliminate the capture of any debris (not shown) present in fluid flow 102. In other embodiments, leading edge 12A and trailing edge 12D of support arm 12 can be rounded or otherwise shaped to minimize turbulence as fluid flow 102 goes by while also providing the necessary structural integrity to support obstruction 14.

As mentioned above, one or more measurement ports are provided in support arm 12 at a location(s) that is upstream of compressed-flow region 16. In the illustrated embodiment, a single port 12E (also shown in FIG. 4) is located at leading edge 12C. However, it is to be understood that the upstream port(s) could be located near leading edge 12C without departing from the scope of the present invention. A manifold 12F formed in support arm 12 provides fluid communication between port 12E and end 12A at arrangement 20. Typically, a sensor 200 is positioned outside of conduit 100 and is fluid communication with manifold 12F. Sensor 200 is used to collect upstream (i.e., non-compressed) information concerning fluid flow 102. Sensor 200 can be a pressure sensor, strain gauge, fiber optic sensor, etc., and can be used in conjunction with a temperature sensor.

Obstruction 14 has a forward portion 14A defining a nose cone shape facing fluid flow 102 and an aft portion 14B coupled to forward portion 14A and downstream thereof with respect to the flow direction of fluid flow 102. The delineation between forward portion 14A and portion 14B is indicated in the figure by dashed line 15. The particular geometry of the nose cone shape is not a limitation of the present invention provided that the upstream tip 14C thereof defines the minimum radius of forward portion 14A and the downstream end of forward portion 14A defines the maximum radius thereof. Accordingly, upstream tip 14C could be pointed, rounded, blunt, etc., without departing from the scope of the present invention. Further, the external shape of forward portion 14A between tip 14C and the end thereof at delineation line 15 can be conical, bi-conical, elliptical, concave, convex, etc., without departing from the scope of the present invention.

Figure 5:
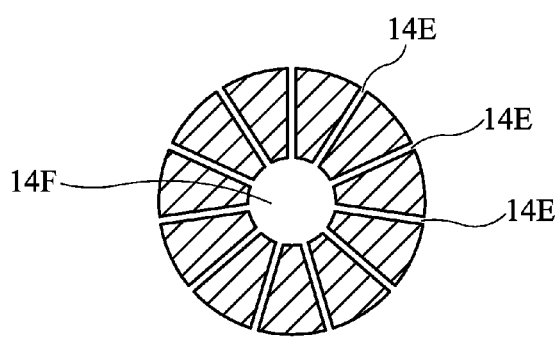
FIG. 5 is a cross-sectional view of the device's flow obstruction taken along line 5-5 in FIG. 1.

As fluid flow 102 moves past obstruction 14, the fluid is compressed. To compress fluid flow 102 evenly thereabout (or nearly so), support arm 12 positions obstruction 14 such that tip 14C and the remainder of forward portion 14A are centrally positioned in conduit 100. To facilitate measurement of attributes of fluid flow 102 so-compressed at region 16, one or more measurement ports in obstruction 14 can be positioned at location(s) aligned with the maximum radius portion of forward portion 14A at delineation line 15 or at locations downstream thereof. In the illustrated embodiment, a number of ports 14E are formed in forward portion 14A at delineation line 15. More specifically, ports 14E are distributed circumferentially about forward portion 14A so that each port 14E faces compressed-flow region 16 along delineation line 15. Referring additionally to FIG. 5, ports 14E are in fluid communication with a single manifold 14F that provides fluid communication between ports 14E and support arm end 12A at arrangement 20. That is, manifold 14F extends through forward portion 14A and support arm 12. By providing ports 14E annularly about forward portions 14A and linking them to manifold 14F, the attributes of fluid flow 102 at region 16 are averaged. It should be noted that the number/locations of the ports can be dependent on a variety of factors such as the fluid's velocity, density, etc. Accordingly, the number and locations of ports 14E can be varied from those shown without departing from the scope of the present invention.

Typically, another sensor 202 is positioned outside of conduit 100 and in fluid communication with manifold 14F. Sensor 202 is used to collect downstream/compressed-flow information concerning fluid flow 102. Similar to sensor 200, sensor 202 can be a pressure sensor, strain gauge, fiber optic sensor, etc., and can be used in conjunction with a temperature sensor.

Aft portion 14B of obstruction 14 can be shaped in a variety of ways without departing from the scope of the present invention. For example, in the illustrated embodiment, the outer shape of aft portion 14B is substantially the mirror image of forward portion 14A with respect to delineation line 15. However, the present invention is not so limited as the outer shapes of aft portion 14B could be altered in a way designed to minimize turbulence, pressure loss, etc., or create/induce some secondary movement/action in fluid flow 102 moving past aft portion 14B.

Figure 6:
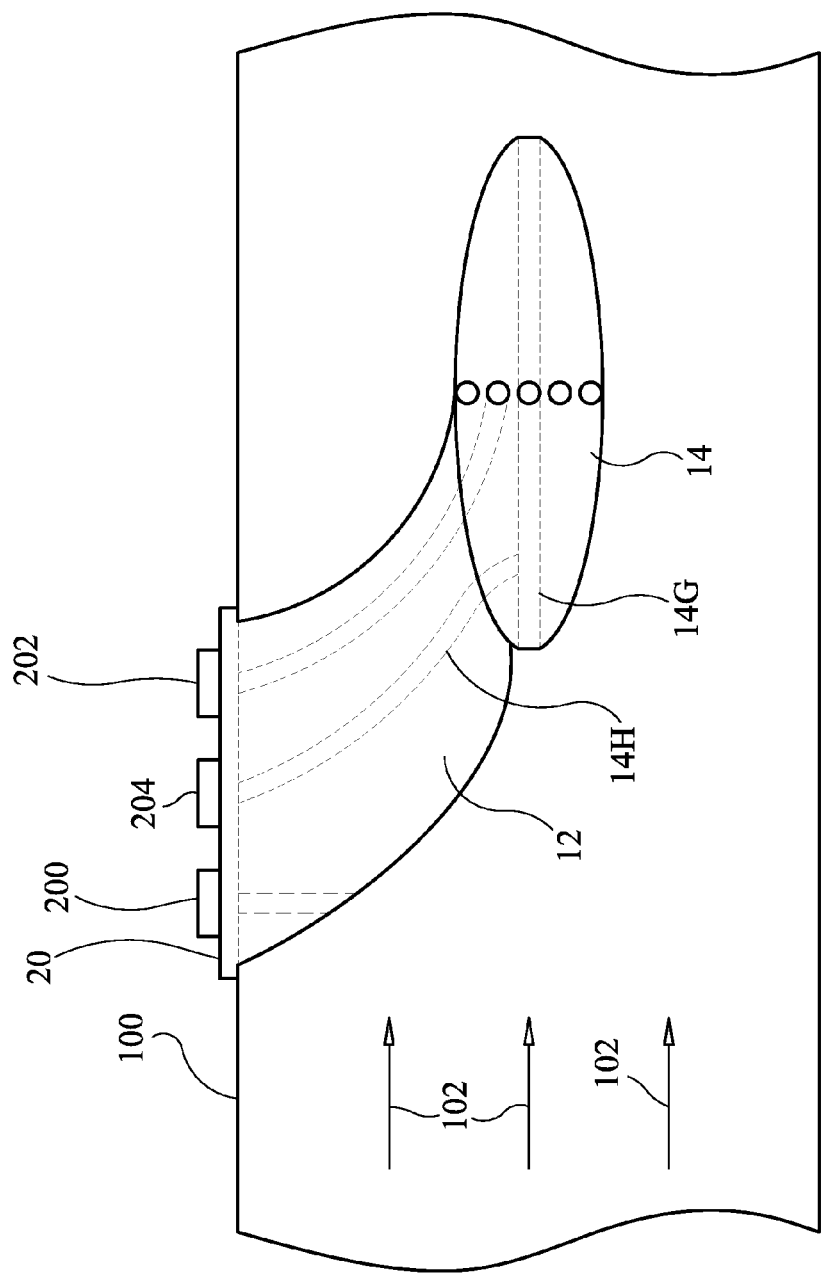
FIG. 6 is a side view of a self-contained device in accordance with another embodiment of the present invention.

The present invention can also be adapted to facilitate the measurement of attributes of fluid flow 102 inside of compressed-flow region 16 or at the central portion of conduit 100. For example, as illustrated in FIG. 6, a longitudinal flow through channel 14G could be formed through the longitudinal center of obstruction 14. Another manifold 14H is provided in fluid communication with channel 14G where manifold 14H extends up to arrangement 20 where another sensor 204 can be used for data measurement.

The advantages of the present invention are numerous. The self-contained device will provide for multiple differential measurements in a fluid flow. The device is easily installed in existing conduits and does not disturb the basic conduit installation or structural integrity. The device's measurements ports are fixed/known 'a priori' thereby eliminating the need for calibration at each installation. The device is configured to greatly reduce or eliminate the possibility of being clogged with foreign matter and debris and will, therefore, require little or no maintenance and will not impact flow/pump efficiencies. The multiple differential measurement locations enable flow cross-checking to evaluate proper instrumentation function and to calculate flowing fluid properties such as density, viscosity, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A compressed-flow generation device for use in making differential measurements of flow attributes, comprising:
   a flow obstruction having a forward portion and an aft portion, said forward portion consisting of a nose cone having a sealed minimum-radius tip and a maximum-radius portion, said aft portion coupled to said maximum-radius portion;
   a support arm having a first end and a second end, said first end adapted to be coupled to an exterior wall of a conduit, said second end coupled to said forward portion of said flow obstruction, wherein said support arm is adapted to position said flow obstruction in the conduit wherein a flow region is defined around said maximum-radius portion, and wherein said first end and said second end are separated from one another with respect to a length dimension of the conduit;
   at least one upstream measurement port formed in said support arm;
   a first manifold formed in said support arm and in fluid communication with said at least one upstream measurement port, said first manifold terminating and accessible at the exterior wall of the conduit;
   at least one downstream measurement port formed in said flow obstruction; and
   a second manifold formed in said flow obstruction and said support arm, said second manifold in fluid communication with said at least one downstream measurement port, said second manifold terminating and accessible at the exterior wall of the conduit.

2. A compressed-flow generation device as in claim 1, wherein said at least one downstream measurement port comprises a plurality of downstream measurement ports distributed circumferentially about said forward portion at said maximum-radius portion.

3. A compressed-flow generation device as in claim 1, wherein said aft portion is shaped as a mirror image of said forward portion.

4. A compressed-flow generation device as in claim 1, wherein said support arm is shaped to position said minimum-radius tip at a central portion of the conduit.

5. A compressed-flow generation device as in claim 1 wherein, in terms of a fluid flow direction in the conduit, said first end is upstream of said second end, and wherein said support arm defines a tapered edge facing the fluid flow direction.

6. A compressed-flow generation device as in claim 5, wherein said at least one upstream measurement port is located at said tapered edge.

7. A compressed-flow generation device for use in making differential measurements of attributes of a fluid moving in a flow direction through a conduit, comprising:
   a flow obstruction having a sealed minimum-radius tip and a maximum-radius portion;
   an arcuately-shaped support arm having a first end and a second end, said first end adapted to be coupled to an exterior wall of a conduit, said second end coupled to said flow obstruction, wherein said support arm is adapted to position said flow obstruction in the conduit with said minimum-radius tip upstream of said maximum-radius portion with respect to the flow direction wherein a flow region is defined around said maximum-radius portion, and wherein said first end and said second end are separated from one another along the flow direction with said first end being upstream of said second end;
   at least one measurement port formed in said support arm;
   a first manifold formed in said support arm and in fluid communication with said at least one measurement port so-formed in said support arm, said first manifold terminating and accessible at the exterior wall of the conduit;
   at least one measurement port formed in said flow obstruction at said maximum-radius portion; and
   a second manifold formed in said flow obstruction and said support arm, said second manifold in fluid communication with said at least one measurement port so-formed in said flow obstruction, said second manifold terminating and accessible at the exterior wall of the conduit.

8. A compressed-flow generation device as in claim 7, wherein said flow obstruction comprises a nose cone shape between said minimum-radius tip and said maximum-radius portion.

9. A compressed-flow generation device as in claim 7, wherein said at least one measurement port so-formed in said flow obstruction comprises a plurality of measurement ports distributed circumferentially about said flow obstruction at said maximum-radius portion.

10. A compressed-flow generation device as in claim 7, wherein said support arm is shaped to position said minimum-radius tip at a central portion of the conduit.

11. A compressed-flow generation device as in claim 7, wherein said support arm defines a tapered edge facing the flow direction.

12. A compressed-flow generation device as in claim 11, wherein said at least one measurement port so-formed in said support arm is located at said tapered edge.

13. A compressed-flow generation device for use in making differential measurements of attributes of a fluid moving in a flow direction through a conduit, comprising an integrated device adapted to be inserted through an aperture formed in an exterior wall of a conduit, adapted to be suspended from and sealed to the exterior wall at the aperture, and adapted to reside in the conduit, said integrated device including a flow obstruction having a sealed minimum-radius tip and a maximum-radius portion adapted to pass through the aperture, an arcuately-shaped support arm adapted to pass through the aperture, said support arm having a first end and a second end, said first end adapted to be coupled to the exterior wall, said second end coupled to said flow obstruction, wherein said support arm is adapted to position said flow obstruction in the conduit with said minimum-radius tip upstream of said maximum-radius portion with respect to the flow direction wherein a flow region is defined around said maximum-radius portion, and wherein said first end and said second end are separated from one another along the flow direction with said first end being upstream of said second end, at least one measurement port formed in said support arm, a first manifold formed in said support arm and in fluid communication with said at least one measurement port so-formed in said support arm, said first manifold terminating and accessible at the exterior wall, at least one measurement port formed in said flow obstruction, and a second manifold formed in said flow obstruction and said support arm, said second manifold in fluid communication with said at least one measurement port so-formed in said flow obstruction, said second manifold terminating and accessible at the exterior wall of the conduit.

14. A compressed-flow generation device as in claim 13, wherein said flow obstruction comprises a nose cone shape between said minimum-radius tip and said maximum-radius portion.

15. A compressed-flow generation device as in claim 13, wherein said at least one measurement port so-formed in said flow obstruction comprises a plurality of measurement ports distributed circumferentially about said flow obstruction at said maximum-radius portion.

16. A compressed-flow generation device as in claim 13, wherein said support arm is shaped to position said minimum-radius tip at a central portion of the conduit.

17. A compressed-flow generation device as in claim 13, wherein said support arm defines a tapered edge facing the flow direction.

18. A compressed-flow generation device as in claim 17, wherein said at least one measurement port so-formed in said support arm is located at said tapered edge.

* * * * *